United States Patent
Kim

(10) Patent No.: US 9,252,925 B2
(45) Date of Patent: Feb. 2, 2016

(54) COMMUNICATION APPARATUS, COMMUNICATION SYSTEM, AND COMMUNICATION METHOD

(75) Inventor: Ki-uk Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 638 days.

(21) Appl. No.: 13/293,278

(22) Filed: Nov. 10, 2011

(65) Prior Publication Data

US 2012/0230234 A1    Sep. 13, 2012

(30) Foreign Application Priority Data

Mar. 8, 2011  (KR) .................. 10-2011-0020620

(51) Int. Cl.
*H04L 1/16*  (2006.01)
*H04L 1/18*  (2006.01)
*H04L 1/00*  (2006.01)

(52) U.S. Cl.
CPC ............ *H04L 1/1692* (2013.01); *H04L 1/1854* (2013.01); *H04L 1/1896* (2013.01); *H04L 2001/0093* (2013.01)

(58) Field of Classification Search
CPC ... H04L 1/1692; H04L 1/1854; H04L 1/1896; H04L 2001/0093
See application file for complete search history.

(56) References Cited

U.S. PATENT DOCUMENTS

| | | | |
|---|---|---|---|
| 8,116,249 B2* | 2/2012 | Shiba et al. | 370/312 |
| 8,220,047 B1* | 7/2012 | Soghoian et al. | 726/22 |
| 2001/0035841 A1* | 11/2001 | Porcino | 342/387 |
| 2001/0046875 A1 | 11/2001 | Davies | |
| 2001/0055356 A1 | 12/2001 | Davies | |
| 2010/0202347 A1* | 8/2010 | Sridhara et al. | 370/328 |
| 2010/0254358 A1* | 10/2010 | Huang et al. | 370/338 |
| 2010/0296427 A1* | 11/2010 | Lohr et al. | 370/312 |
| 2011/0086614 A1* | 4/2011 | Brisebois et al. | 455/411 |

OTHER PUBLICATIONS

Canzian et al., "Overlapped NACKs: Improving Multicast Performance in Multi-access Wireless Networks," IEEE Globecom 2010 Workshop on Pervasive Group Communications, Dec. 5-10, 2010, IEEE, pp. 1469-1474 (Dec. 2010).

Kuri et al., "Reliable Multicast in Multi-access Wireless LANs," Proceedings of INFOCOM'99: Conference on Computer Communications, Mar. 21-25, 1999, IEEE, vol. 2, pp. 760-767 (Mar. 1999).

Liang et al., "Performance Analysis and Reliability Improvement of Bluetooth Broadcast Scheme," 2006 1st International Symposium on Pervasive Computing and Applications, Aug. 3-5, 2006, IEEE, pp. 775-780, (Aug. 2006).

(Continued)

*Primary Examiner* — Alpus H Hsu
*Assistant Examiner* — Walter Divito
(74) *Attorney, Agent, or Firm* — Drinker Biddle & Reath LLP

(57) ABSTRACT

A communication apparatus including a short-distance communication module, wherein the short-distance communication module selectively performs one-to-one communication or one-to-many communication in short-distance communication, and sets a sampling rate for sampling transmission data of the communication apparatus to be greater than the inverse of an arrival time difference of the transmission data determined according to a maximum communication distance between communication apparatuses.

18 Claims, 11 Drawing Sheets

(56) References Cited

OTHER PUBLICATIONS

Na et al., "PHY-MAC Cross-Layer Design of Reliable Wireless Multicast Protocol with a Case Study of MB-OFDM WPAN," Embedded Software and Systems, Third International Conference, ICESS 2007, Proceedings, May 14-16, 2007, Springer-Verlag, pp. 676-685 (May 2007).
Search Report established for GB 1200270.5 (May 4, 2012).
Search Report established for GB 1200270.5 (Oct. 22, 2012).

* cited by examiner

COMMUNICATION APPARATUS, COMMUNICATION SYSTEM, AND COMMUNICATION METHOD

CROSS-REFERENCE TO RELATED PATENT APPLICATIONS

This application claims the priority benefit of Korean Patent Application No. 10-2011-0020620, filed on Mar. 8, 2011 in the Korean Intellectual Property Office, the entirety of which is incorporated herein by reference.

BACKGROUND

1. Field of the Invention

The invention relates to a communication apparatus, a communication system, and a communication method.

2. Description of the Related Art

In one-to-one communication in a traditional communication system, a transmitting terminal transmits data of one frame and a receiving terminal transmits an ACK signal confirming correct receipt of the frame and data to the transmitting terminal. If the data is not correctly received, the receiving terminal transmits a NACK signal. After correctly receiving an ACK signal from the receiving terminal, the transmitting terminal transmits data of the next frame to the receiving terminal. When a NACK signal is received from the receiving terminal, or an ACK signal has not been correctly received or received during a predetermined time period, the data that has already been transmitted is retransmitted.

In one-to-many communication in a traditional communication system, a single transmitting terminal transmits data to a plurality of receiving terminals; the transmitting terminal transmits the data to the receiving terminals using identifying (ID) information for each of the receiving terminals. A receiving terminal checks whether the ID information is correct and receives the data when the ID information is correct. Otherwise, the receiving terminal disposes of the received data.

SUMMARY

The invention provides a short-distance communication apparatus, a short-distance communication system, and a short-distance communication method that can achieve the speed of one-to-one communication during the one-to-one communication while maintaining a protocol type of the one-to-one communication and without checking how many receiving terminals are present.

The invention provides a communication apparatus, a communication system, and a communication method that may enable a user to freely set one-to-one communication and one-to-many communication, and may protect data from being incorrectly transmitted to a third-party terminal, which is not a correct receiving terminal, during one-to-one communication, to prevent a security problem occurring because the same protocol is used for both the one-to-one communication and the one-to-many communication.

According to an aspect of the invention, a communication apparatus includes a short-distance communication module, wherein the short-distance communication module selectively performs one-to-one communication or one-to-many communication in short-distance communication, and sets a sampling rate for sampling transmission data of the communication apparatus to be greater than the inverse of an arrival time difference of the transmission data determined according to a maximum communication distance between communication apparatuses.

The short-distance communication module may set the sampling rate to be four times greater than the inverse of the arrival time difference.

The short-distance communication module may set the sampling rate to be eight times greater than the inverse of the arrival time difference.

The short-distance communication module may utilize a bit for identifying the one-to-one communication versus the one-to-many communication in a header of the transmission data.

In the case of one-to-one communication, the short-distance communication module may receive the transmission data, randomly generate an ACK signal, and transmit a generated ACK signal to a communication apparatus transmitting the transmission data.

In the case of one-to-many communication, the short-distance communication module may receive the transmission data and transmits an ACK signal dedicated to one-to-many communication to a communication apparatus transmitting the transmission data.

According to another aspect of the invention, a communication system includes a first communication apparatus that sets a sampling rate for sampling transmission data to be greater than the inverse of an arrival time difference of the transmission data determined according to a maximum communication distance from a second communication apparatus, and transmits the transmission data to the second communication apparatus, and a second communication apparatus that receives the transmission data from the first communication apparatus, and transmits an ACK signal to the first communication apparatus.

There may be at least two second communication apparatuses.

The first communication apparatus may selectively perform one-to-one communication or one-to-many communication in a short-distance communication.

The first communication apparatus may utilize a bit for signifying the one-to-one communication versus the one-to-many communication in a header of the transmission data.

In the case of one-to-one communication, the second communication apparatus may receive the transmission data, randomly generate an ACK signal, and transmit the generated ACK signal to the first communication apparatus.

The first communication apparatus may check the ACK signal transmitted by the second communication apparatus and transmit the transmission data to the second communication apparatus.

When receiving an ACK signal from another second communication apparatus, the first communication apparatus may compare the ACK signal received from the second communication apparatus with the ACK signal received from the other second communication apparatus and, if the ACK signals do not match with each other, retransmit the transmission data to the second communication apparatus.

When retransmitting the transmission data and receiving an ACK signal from the other second communication apparatus, the first communication apparatus may compare the ACK signal received from the second communication apparatus with the ACK signal received from the other second communication apparatus and, if the ACK signals do not match with each other, stop transmission of the transmission data.

In the case of one-to-many communication, each of the second communication apparatus and the other second communication apparatus may receive the transmission data and transmit an ACK signal dedicated to one-to-many communication to the first communication apparatus.

The first communication apparatus may be a digital photographing apparatus having a short-distance communication module.

According to another aspect of the invention, a communication method includes activating a short-distance communication module, in a controller of each of a transmitting terminal and a receiving terminal, selecting one-to-many communication, using the controller of the transmitting terminal, setting a bit corresponding to one-to-many communication in a header of data of an image to be transmitted, using the short-distance communication module of the transmitting terminal, transmitting a first frame of the image to be transmitted to the receiving terminal, using the short-distance communication module of the transmitting terminal, checking the bit of the header to check the one-to-many communication, using the short-distance communication module of the receiving terminal, checking the received first frame and requesting a second frame, using the controller of the receiving terminal, transmitting an ACK signal dedicated to one-to-many communication to the transmitting terminal, using the short-distance communication module of the receiving terminal, and checking the ACK signal dedicated to one-to-many communication and transmitting the second frame to the receiving terminal, using the short-distance communication module of the transmitting terminal.

There may be at least two receiving terminals, and the communication method may further include checking the ACK signals dedicated to one-to-many communication received from the at least two receiving terminals, using the short-distance communication module of the transmitting terminal, and retransmitting the first frame to the at least two receiving terminals when the received ACK signals dedicated to one-to-many communication are not matched with each other or a NACK signal is received from at least one receiving terminal.

According to another aspect of the invention, a communication method includes activating a short-distance communication module, in a controller of each of a transmitting terminal and a receiving terminal, selecting one-to-one communication, using the controller of the transmitting terminal, setting a bit corresponding to one-to-one communication in a header of data of an image to be transmitted, using the short-distance communication module of the transmitting terminal, transmitting a first frame of the image to be transmitted to the receiving terminal, using the short-distance communication module of the transmitting terminal, checking the bit of the header to check the one-to-one communication, using the short-distance communication module of the receiving terminal, checking the received first frame and requesting a second frame, using the controller of the receiving terminal, randomly generating an ACK signal and transmitting the generated ACK signal to the transmitting terminal, using the short-distance communication module of the receiving terminal, and checking the ACK signal and transmitting the second frame to the receiving terminal, using the short-distance communication module of the transmitting terminal.

In the checking of the ACK signal using the short-distance communication module of the transmitting terminal, if the ACK is abnormal, the first frame may be retransmitted to the receiving terminal.

In the checking of the ACK signal using the short-distance communication module of the transmitting terminal, if the ACK signal is determined to be abnormal at least one time, the transmission of the image to the receiving terminal may be stopped.

When the transmission of the image is stopped, a user may be notified of the stop of the transmission of the image, using the controller of the transmitting terminal.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1A:
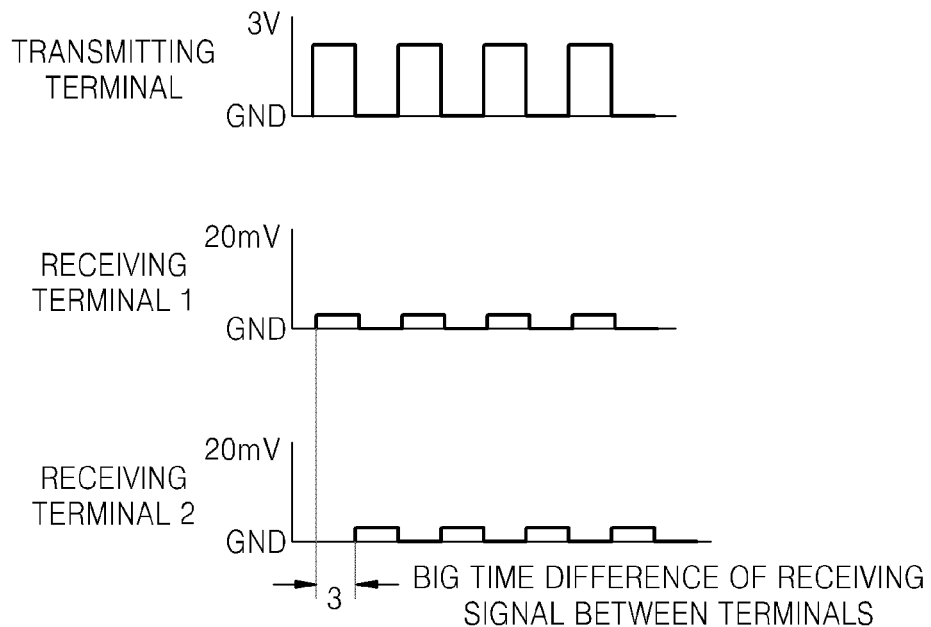
FIGS. 1A and 1B are signal diagrams respectively illustrating cases of one-to-many communication with a fading effect and without a fading effect.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

The terms such as "first" and "second" are used herein merely to identify a variety of constituent elements, but the constituent elements are not limited by the terms. The terms are used only for the purpose of distinguishing one constituent element from another constituent element.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, the invention will be described in detail by explaining embodiments of the invention with reference to the attached drawings. Like reference numerals in the drawings denote like elements and any redundant explanation thereon will be omitted.

To perform traditional one-to-many communication, a transmitting terminal identifies the ID of each receiving terminal and separately assigns data according to the ID. Accordingly, data throughput at a receiving terminal is reduced in proportional to the number of receiving terminals. Accordingly, communication speed decreases so that it may be advantageous to perform multiple one-to-one communications rather than one-to-many communication in some short-distance communication systems.

In a short-distance communication over a short communication distance of, for example, a distance of 5 centimeters (cm) or less, one-to-one communication and one-to-many communication may be visually distinguishable, and it is impossible for a third party to intercept data being transmitted during one-to-one communication. However, that is not the case when the short communication distance is, for example, 30 cm. In this case, when a transmitting terminal transmits image data divided into frames and a receiving terminal receives the data and transmits an ACK signal indicating correct receipt of the data of each frame, a third-party user, whether he/she is malicious or not, may receive the data transmitted by the transmitting terminal. In this case, a security problem between the transmitting terminal and the receiving terminal may be present because a third-party user, in good faith, receives unwanted data.

To address this problem, a plurality of protocols may be used. However, traditional solutions may nullify the benefit of the no-fading effect that is a characteristic of short-distance communication. Accordingly, when a traditional method of checking the number of receiving terminals and assigning an ID for each terminal in each communication is used, communication speed may be unavoidably decreased.

A short-distance communication having a communication distance of tens of centimeters is different in many ways from a general communication environment. For example, because there is no fading effect, a response speed of a receiving terminal after transmission can be substantially constant. Also, the time for the ACK signal output from the receiving terminal to arrive at the transmitting terminal can be substantially constant.

Figure 1B:
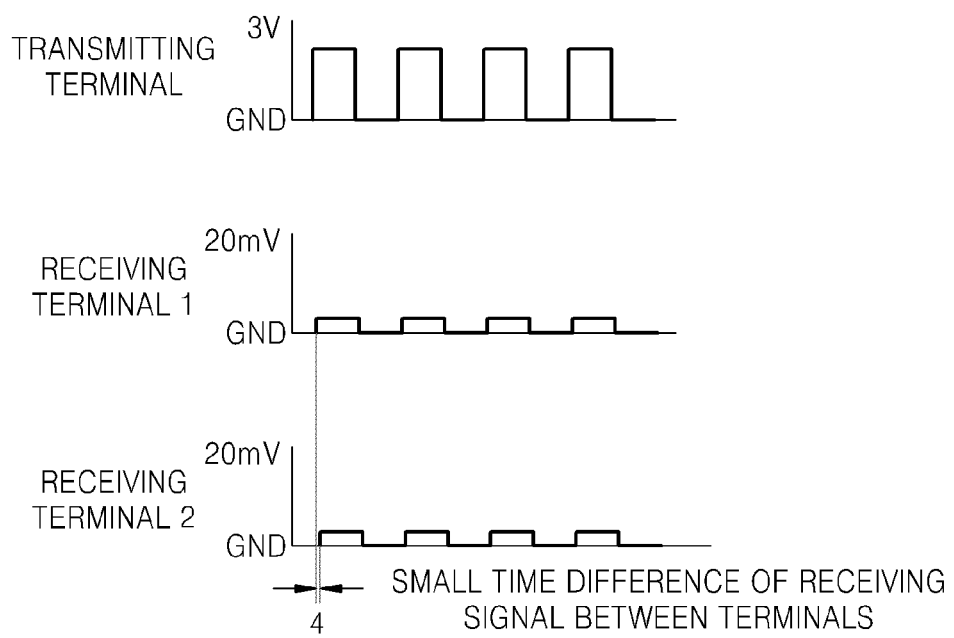

FIGS. 1A and 1B are signal diagrams respectively illustrating cases of one-to-many communication with a fading effect and without a fading effect. FIG. 1A corresponds to a general communication environment, and FIG. 2A corresponds to a short-distance communication environment. Referring to FIG. 1A, in a general communication environment, a signal transmitted by a transmitting terminal is received at a receiving terminal 1 and a receiving terminal 2 with a time gap 3 due to a fading effect. However, referring to FIG. 1B, because there is no fading effect between a transmitting terminal and a receiving terminal in a short-distance communication environment, a time gap 4 in receiving a signal between the receiving terminal 1 and the receiving terminal 2 is substantially smaller or hardly exists.

In a short-distance communication, because a distance between the transmitting terminal and the receiving terminal is short, a multipath fading effect due to multiple paths is small and there is primarily only an influence due to a signal-transmitting time gap according to a difference in the distance between the transmitting terminal and the receiving terminal. That a fading effect is small signifies that when there are many receiving terminals around a single transmitting terminal, a signal transmitted by the transmitting terminal arrives at the respective receiving terminals at substantially the same time.

In communication apparatuses according to the invention, to perform one-to-many communication with multiple one-to-one communications in a short-distance communication system, a communication frequency used for communication is set to have a difference in a signal arrival time within 50% of a sampling rate of a transmission signal in the short-distance communication system. For example, in a short-distance communication system having a maximum communication distance of 30 cm, a time difference of a signal transmitted by the transmitting terminal arriving at the receiving terminals is 1 nanosecond (nsec) at its maximum, assuming a propagation speed of 300 meters per microsecond (m/μsec). In order to have such a time difference demodulated without difficulty even at a sampling rate that is four times greater than one cycle of data to be transmitted, 12.5% of a sampling rate should be greater than 1 nsec to allow the receiving terminals to receive data at substantially the same time. That is, when the time difference when a signal transmitted by the transmitting terminal arrives at the receiving terminal is 1 nsec, an ACK signal transmitted by the receiving terminal should be received by the transmitting terminal so that the time difference is 2 nsec. Thus, considering the above, when the sampling rate for sampling data to be transmitted by the transmitting terminal is set to be greater, preferably four times and more preferably eight times, than the inverse of a difference in the signal arrival time (i.e., 1/difference in signal arrival time) between the transmitting and receiving terminals, which is determined according to a difference in the distance between the transmitting and receiving terminals, the transmitting terminal may almost simultaneously receive the ACK signal transmitted by the receiving terminals that received the transmission data so that one-to-one communication or one-to-many communication may be more effectively performed.

In the communication apparatuses according to the invention, a signal transmitted by a single transmitting terminal is transmitted to a plurality of receiving terminals, the receiving terminals receive the data at substantially the same time and almost simultaneously transmit ACK signals to the transmitting terminal, and the transmitting terminal receives the ACK signals transmitted by the receiving terminals. Because the ACK signals received by the transmitting terminal are all identical, the transmitting terminal receives a single normal ACK signal without collision. Thus, the data to be transmitted may be transmitted from a single transmitting terminal to the receiving terminals.

Figure 2:
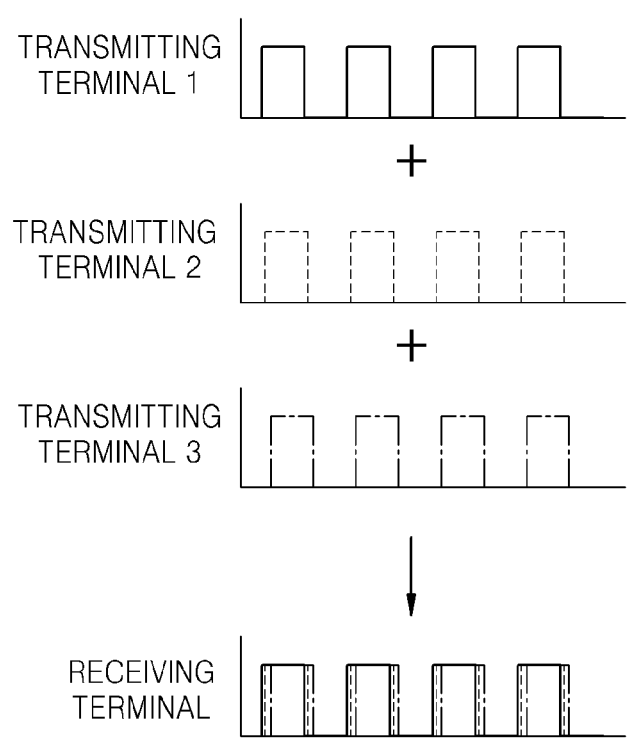
FIG. 2 is a signal diagram illustrating a case of receiving a signal in one-to-many communication.

FIG. 2 is a signal diagram illustrating a case of receiving an identical signal in one-to-many communication. Referring to FIG. 2, when a receiving terminal almost simultaneously receives signals transmitted by a plurality of transmitting terminals, a complete signal is received without signal interference. Thus, because a communication apparatus according to the invention almost simultaneously receives ACK signals transmitted by the receiving terminals, the transmitting terminal receives a complete ACK signal so that one-to-many communication becomes more efficient. For this purpose, each of the receiving terminals needs to immediately check received data and determine whether the received data was correctly received, and transmit an ACK signal to the transmitting terminal within a predetermined time.

Figure 3:
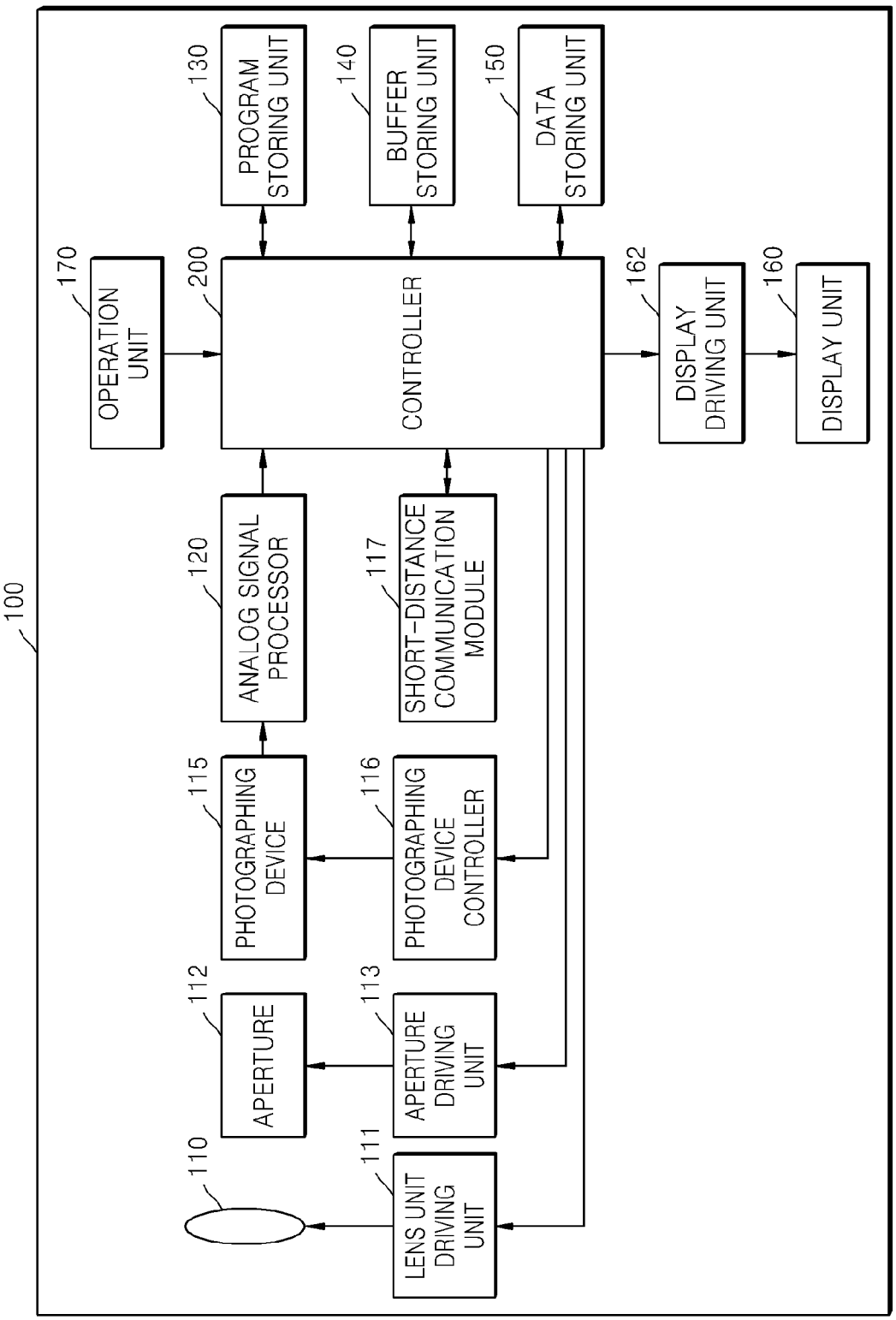
FIG. 3 is a block diagram schematically illustrating the structure of a digital photographing apparatus as an example of a communication apparatus, according to an embodiment of the invention.

FIG. 3 is a block diagram schematically illustrating the structure of a digital photographing apparatus 100 as an example of a communication apparatus according to an embodiment of the invention. A communication apparatus according to the present embodiment includes a short-distance communication module 117. The short-distance communication module 117 sets a sampling rate for sampling data to be transmitted to be greater, preferably four times and more preferably eight times, than the inverse of a difference in the signal arrival time between the transmitting and receiving terminals that is determined according to a difference in the distance between the transmitting and receiving terminals. The digital photographing apparatus 100 may include portable digital devices such as digital cameras, mobile phones, smart phones, personal digital assistants (PDAs), portable multimedia players (PMPs), or camcorders.

The digital photographing apparatus 100 may include a lens unit 110, a lens unit driving unit 111, an aperture 112, an aperture driving unit 113, a photographing device 115, a photographing device controller 116, an analog signal processor 120, a program storing unit 130, a buffer storing unit 140, a data storing unit 150, a display driving unit 162, a display unit 160, a controller 200, and an operation unit 170. The lens unit 110, the lens unit driving unit 111, the aperture 112, the aperture driving unit 113, the photographing device 115, the photographing device controller 116, and the analog signal processor 120 may be referred to as a photographing unit.

The lens unit 110 focuses incident light. The lens unit 110 may include a zoom lens for controlling a viewing angle to be increased or decreased according to a focal length and a focus lens for adjusting a focus of an object to be captured. The zoom lens and the focus lens each may be formed of a single lens or a group of lenses. The aperture 112 adjusts an amount of incident light according to a degree of opening thereof. The lens unit driving unit 111 and the aperture driving unit 113 receive a control signal from the controller 200 and respectively drive the lens unit 110 and the aperture 112. The lens unit driving unit 111 adjusts the focal length by controlling a position of a lens to perform operations of auto-focusing, zoom change, and focus change. The aperture driving unit 113 adjusts the degree of opening of the aperture 112 and performs operations of auto-focusing, auto-exposure correction, focus change, and adjustment of depth of field by controlling an f-number or an aperture value.

An optical signal passing through the lens unit 110 forms an image of the object to be photographed on a light-receiving surface of the photographing device 115. The photographing device 115 may use a charge-coupled device (CCD) sensor, a complementary metal oxide semiconductor image sensor (CIS), or a high speed image sensor for converting an optical signal to an electric signal. A sensitivity of the photographing device 115 may be adjusted by the photographing device controller 116. The photographing device controller 116 may control the photographing device 115 according to a control signal that is automatically generated by an image signal that is input in real time or a control signal that is manually input by an operation of a user. An exposure time of the photographing device 115 is adjusted by a shutter (not shown). The shutter may include a mechanical shutter for adjusting incidence of light by moving a blind or an electronic shutter for controlling exposure by applying an electric signal to the photographing device 115. The analog signal processor 120 performs noise reduction processing, gain control, waveform shaping, and analog-digital conversion processing on an analog signal applied by the photographing device 115.

The short-distance communication module 117 may perform short-distance communication via direct contact or within a range of several centimeters to tens of centimeters, and exchange data with a communication apparatus within a short-distance communication distance according to control of the controller 200. Also, the short-distance communication module 117 according to the present embodiment may set a sampling rate for sampling data to be transmitted to be greater, preferably four times and more preferably eight times, than the inverse of a difference in the signal arrival time between the transmitting and receiving terminals that is determined according to a difference in the distance between the transmitting and receiving terminals, thereby selectively performing one-to-many communication according to a user's selection without changing a one-to-many communication protocol. A detailed structure of the short-distance communication module 117 will be described below with reference to FIG. 4.

The operation unit 170 may be used to input an external control signal, for example, by a user. The operation unit 170 may include a shutter-release button for inputting a shutter-release signal for capturing an image by exposing the photographing device 115 to light for a predetermined time, a power button for inputting a control signal for controlling on/off of a power supply, a wide zoom button and a tele-zoom button for increasing or decreasing a viewing angle according to an input, and a variety of function buttons for selecting a mode such as a text input mode, a photographing mode, a reproduction mode, a white balance setting mode, or an exposure setting mode. The operation unit 170 may include a variety of types of buttons as above, but the invention is not limited thereto. For example, the operation unit 170 may be embodied in any form such as a keyboard, a touch pad, a touch screen, or a remote controller, to be used by a user to input data.

The digital photographing apparatus 100 includes the program storing unit 130 for storing a program such as an operating system for driving the digital photographing apparatus 100 or an application system, the buffer storing unit 140 for temporarily storing data needed for performing an operation or resultant data, and the data storing unit 150 for storing various information needed for the program, such as an image file having an image signal.

The digital photographing apparatus 100 includes the display unit 160 for displaying an operation state of the digital camera or still image data or motion picture data captured by the digital camera 100. The display unit 160 may provide visual information to a user. To provide visual information, the display unit 160 may include, for example, a liquid crystal display panel (LCD) or an organic light-emitting display panel (OLED). The display driving unit 162 provides a driving signal to the display unit 160.

The digital photographing apparatus 100 includes the controller 200, which processes input image signals and controls each element according to a processed input image signal or an external input signal. The controller 200 may be embodied by a digital signal processing (DSP) chip. The controller 200 may reduce noise of input image data and perform image signal processing for improving image quality, such as gamma correction, color filter array interpolation, color matrix, color correction, or color enhancement. Also, the controller 200 may generate an image file by compressing image data generated by performing the image signal processing for improving image quality, or restore image data from an image file. An image compression format may be a reversible format or an irreversible format. Compressed data may be stored in the data storing unit 150.

Also, the controller 200 may generate a control signal to control auto-focusing, zoom change, focus change, or auto-exposure correction by executing a program stored in the program storing unit 130 or using a separate module, and provide a generated control signal to the lens unit driving unit 111, the aperture driving unit 113, and the photographing device controller 116, so that operations of elements, such as a shutter or a flash, provided in the digital photographing apparatus 100 may be generally controlled.

Figure 4:
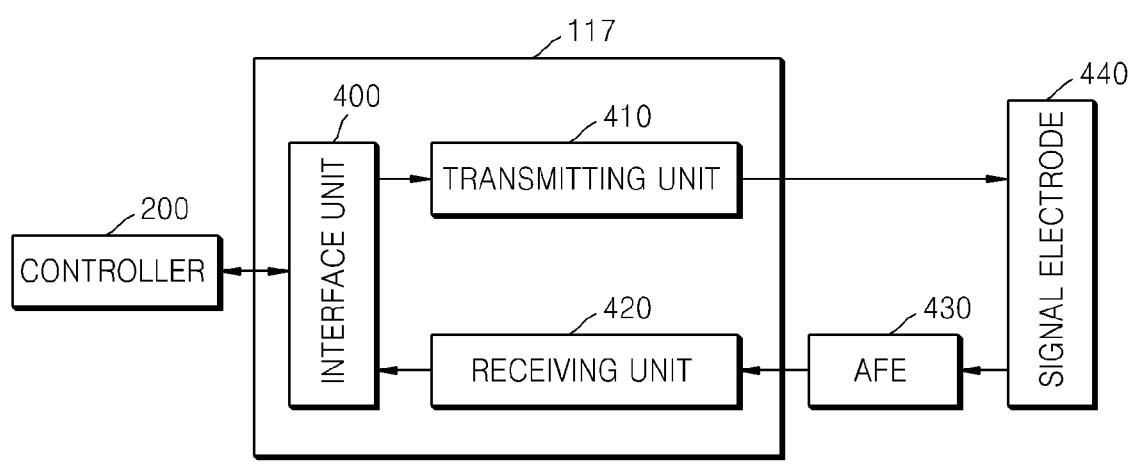
FIG. 4 is a block diagram schematically illustrating the structure of a short-distance communication module of the digital photographing apparatus 100 of FIG. 3, according to an embodiment of the invention.

FIG. 4 is a block diagram schematically illustrating the structure of the short-distance communication module 117 of the digital photographing apparatus 100 of FIG. 3. Referring to FIGS. 3 and 4, the digital photographing apparatus 100 is described as a communication apparatus according to the present embodiment.

Referring to FIG. 4, the short-distance communication module 117 includes an interface unit 400, a transmitting unit 410, and a receiving unit 420. The interface unit 400 controls input/output of data to be transmitted by the transmitting unit 410 or data received by the receiving unit 420. Also, the interface unit 400 controls the short-distance communication module 117 by receiving a control command of the controller 200. For example, the interface unit 400 provides the transmitting unit 410 with a one-to-one communication or a one-to-many communication command received from the controller 200 for image data stored in the digital photographing apparatus 100. Also, the interface unit 400 activates the short-distance communication module 117 according to an activation command received from the controller 200 to activate the short-distance communication module 117.

Figure 5:
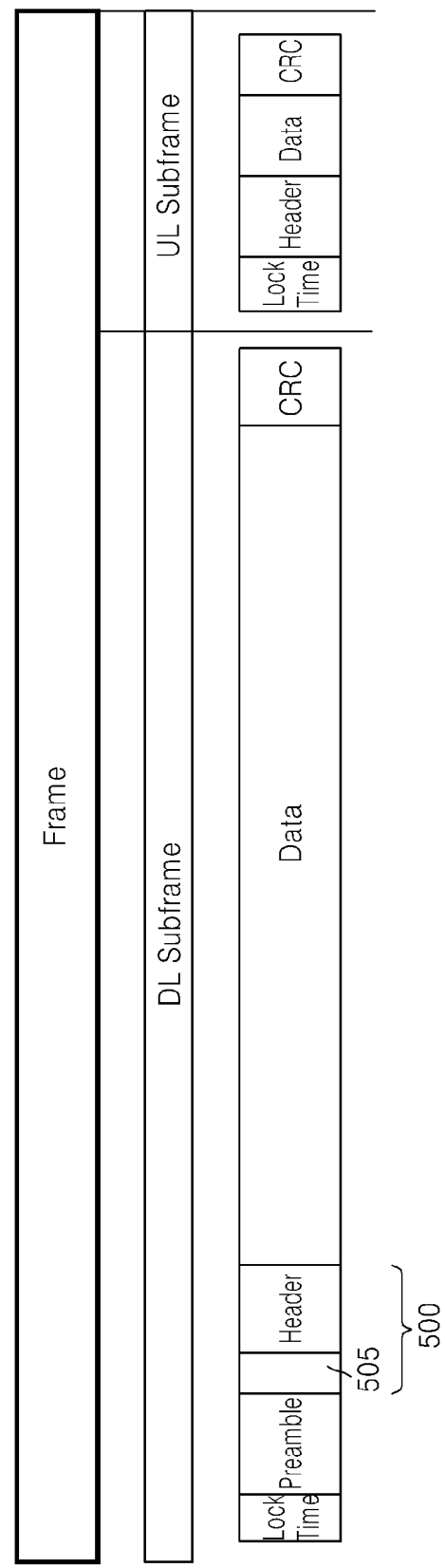
FIG. 5 illustrates a frame structure for short-distance communication, according to another embodiment of the invention.

The transmitting unit 410 transmits data provided by the controller 200 of the digital photographing apparatus 100 to a receiving terminal (not shown) via a signal electrode 440 by diffusing the data that is sampled and modulated. The transmitting unit 410 may include a data generator, a scrambler, a sampling unit, a diffusion unit, a multiplexer, a header generation unit, and a preamble generation unit. A sampling rate for sampling data is set to be greater, preferably four times and more preferably eight times, than the inverse of a difference in the signal arrival time between transmitting and receiving terminals that is determined according to a difference in the distance between the transmitting and receiving terminals, so that one-to-one or one-to-many communication may be selectively performed. Also, the transmitting unit 410 transmits a bit for determining one-to-one versus one-to-many communication by assigning the bit to a header of transmission frame data according to selection of the one-to-one or one-to-many communication by the controller 200. As illustrated in FIG. 5, in a frame structure of transmission data for short-distance communication, a bit 505 indicating either one-to-one or one-to-many communication is assigned to a header portion 500.

Also, when receiving data from another transmitting terminal via the receiving unit 420, the transmitting unit 410 checks the received data and generates and transmits an ACK signal if the received data was received correctly. The transmitting unit 410 receives header information for the data transmitted by another transmitting terminal via the receiving unit 420, and randomly generates an ACK signal when a bit corresponding to one-to-one communication is checked and transmits an ACK signal dedicated to one-to-many communication when a bit corresponding to one-to-many communication is checked.

The receiving unit 420 receives data transmitted by another transmitting terminal. The receiving unit 420 receives transmission data transmitted by another transmitting terminal via the signal electrode 440 according to short-distance communication and receives transmission data passing through an analog front end (AFE) circuit 430 where noise removal and gain amplification are performed. The receiving unit 420 performs a process reverse to that of the transmitting unit 410, for example, separating transmission data into a header and data, reversely diffusing each of the header and data, and demodulating the received data. Also, the receiving unit 420 separates a header from the received transmission data and checks by reading the header whether the received data is transmitted in one-to-one communication or one-to-many communication. A result of the checking is provided to the transmitting unit 410. The transmitting unit 410 randomly generates and transmits an ACK signal in the case of one-to-one communication and transmits an ACK signal dedicated to one-to-many communication in the case of one-to-many communication.

Figure 6:
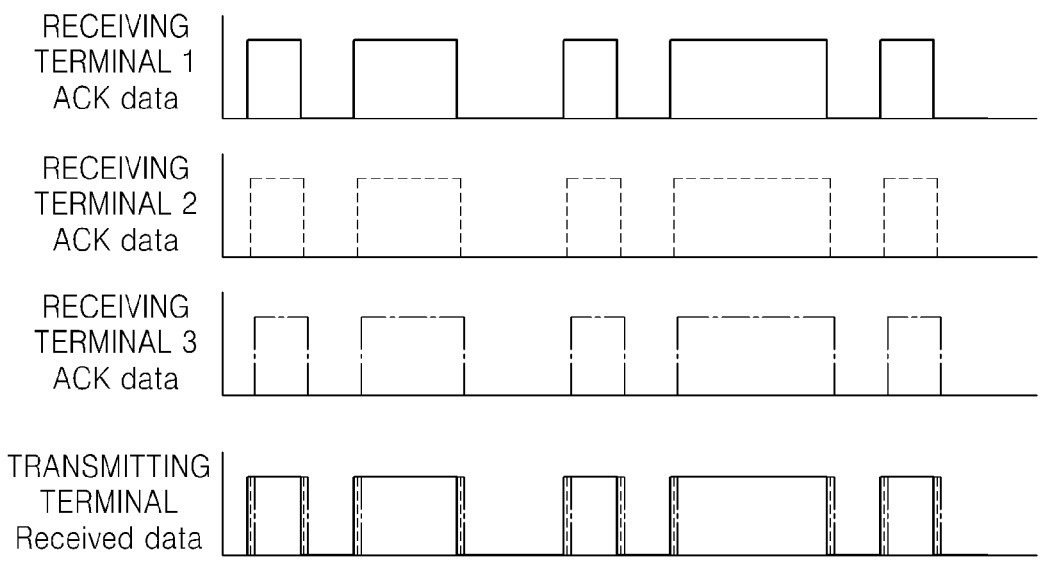
FIGS. 6 and 7 are signal diagrams illustrating an ACK signal received by a receiving terminal, according to another embodiment of the invention.
Figure 7:
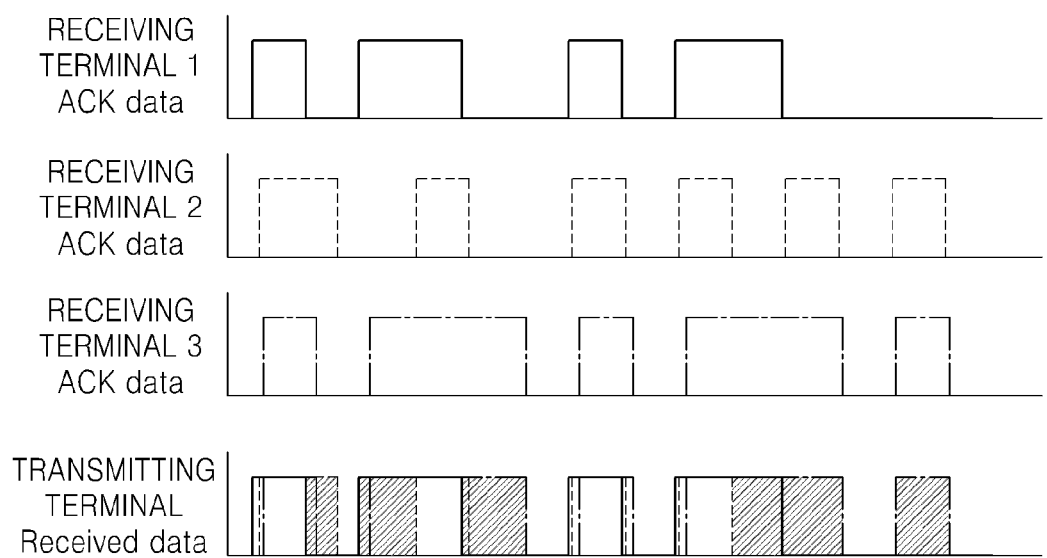

FIGS. 6 and 7 are signal diagrams for explaining an ACK signal received by a transmitting terminal, according to another embodiment of the invention. Referring to FIG. 6, when a receiving terminal 1, a receiving terminal 2, and a receiving terminal 3 transmit the same ACK signal, the transmitting terminal receives the ACK signal that is in a state with hardly any damage. That is, the transmitting terminal may receive the ACK signal without interference. For example, when a user at a transmitting terminal desires to send data in one-to-many communication, the transmitting terminal transmits entire frames by inserting a bit indicating one-to-many communication in a header. When receiving the entire frames, the receiving terminal reads the header to check whether a bit indicating one-to-many communication is included. Once the bit indicating one-to-many communication is checked, the receiving terminal generates an ACK signal dedicated to one-to-many communication and transmits the ACK signal to the transmitting terminal. In the case of one-to-many communication, because the ACK signals transmitted by the receiving terminals are identical, no signal interference is generated even though they overlap. When one of the receiving terminals receives incorrect data, the receiving terminal transmits an NACK signal, not an ACK signal, and thus the transmitting terminal recognizes the NACK signal and resends all the frames that have been transmitted. Then, hopefully, all receiving terminals successfully receive the data.

In the present embodiment, in the case of one-to-many communication, because all receiving terminals having correctly received transmission data transmit identical ACK signals dedicated to one-to-many communication, the transmitting terminal may correctly receive a complete ACK signal as illustrated in FIG. 6.

Referring to FIG. 7, when the receiving terminal 1, the receiving terminal 2, and the receiving terminal 3 transmit different ACK signals, the transmitting terminal receives a signal that does not correctly represent an ACK signal, that is the signal distorted or in an incomplete state. That is, the ACK signals received by the transmitting terminal interfered with one another. In the present embodiment, in the case of one-to-one communication, because the receiving terminals at random times generate and transmit ACK signals, the transmitting terminal does not correctly receive an ACK signal as illustrated in FIG. 7.

For example, when a transmitting terminal user intends to send data in one-to-one communication, the transmitting terminal transmits an entire frame by reflecting one-to-one communication information in a header. The receiving terminal receives the entire frame and checks by reading the header whether the received data is transmitted in one-to-one communication. If the received data is transmitted in one-to-one communication, the receiving terminal after a random delay generates one of a plurality of ACK signals for one-to-one communication and transmits the ACK signal to the transmitting terminal. The transmitting terminal determines whether to send a next frame according to the received ACK signal. When one-to-one communication is selected, if a third-party receiving terminal transmits an ACK signal, the ACK signals transmitted by the receiving terminals are different from one another so that the ACK signals of the receiving terminals interfere with one another. Accordingly, the transmitting terminal may not correctly receive a desired ACK signal. In this case, when the transmitting terminal receives an unexpected ACK signal, the transmitting terminal determines that a communication state is poor and, thus, the ACK signal is distorted and retransmits the sent frame. When the same distorted ACK signal is repeatedly received, the transmitting terminal can determine that there is a third-party receiving terminal around a target receiving terminal, stop transmission, and notify a user thereof. Thus, in the present embodiment, a security problem that may occur when protocols of one-to-one communication and one-to-many communication are identical is solved. In one-to-one communication, data may not be prevented from being transmitted to a third-party receiving terminal other than a target receiving terminal.

Figure 8:
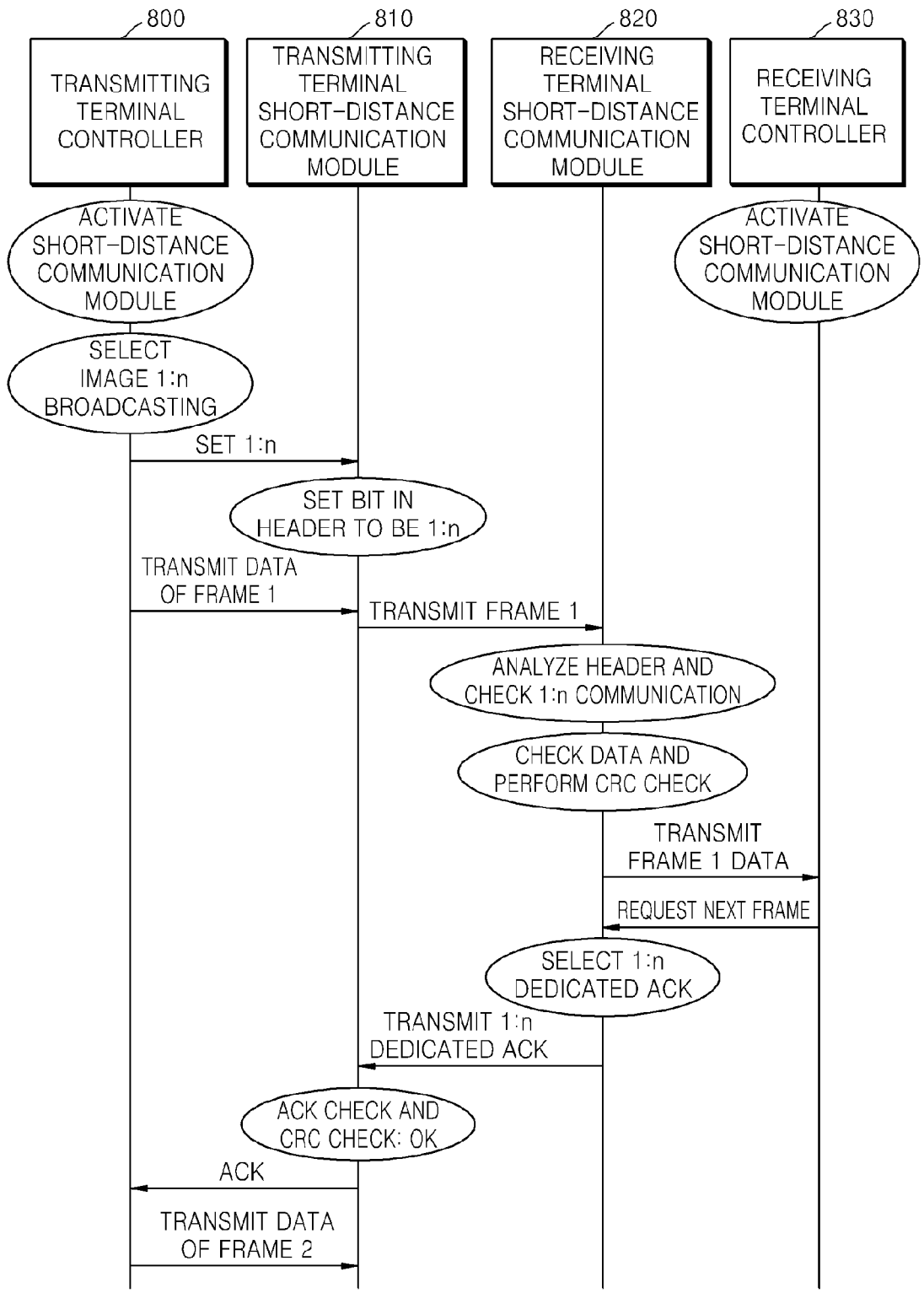
FIG. 8 is a signal flowchart illustrating a communication method, according to another embodiment of the invention.

FIG. 8 is a signal flowchart illustrating a communication method, according to another embodiment of the invention. Referring to FIG. 8, a transmitting terminal controller 800 and a receiving terminal controller 830 each activate respective short-distance communication modules 810 and 820.

When the transmitting terminal controller 800 selects an image one-to-many communication, the transmitting terminal short-distance communication module 810 sets in a header a bit corresponding to one-to-many communication. The transmitting terminal short-distance communication module 810 transmits a frame 1 to a receiving terminal upon request by the transmitting terminal controller 800 to transmit data of the frame 1. Although it is not illustrated, there may be a plurality of receiving terminals. The receiving terminal short-distance communication module 820 separates the header from transmission data and analyzes the header to check whether the received data is transmitted in one-to-many communication. Whether it is one-to-one communication or one-to-many communication is checked by analyzing whether the bit is set in the header. After checking the data and performing a CRC check, the receiving terminal short-distance communication module 820 transmits the frame 1 to the receiving terminal controller 830. The receiving terminal short-distance communication module 820 selects an ACK signal dedicated to one-to-many communication, and transmits the selected ACK signal to the transmitting terminal upon the request of the receiving terminal controller 830 to request a next frame. The transmitting terminal short-distance communication module 810 checks the ACK signal and performs a CRC check. The transmitting terminal short-distance communication module 810 transmits a next frame upon the request by the transmitting terminal controller 800 to transmit a frame 2.

Figure 9:
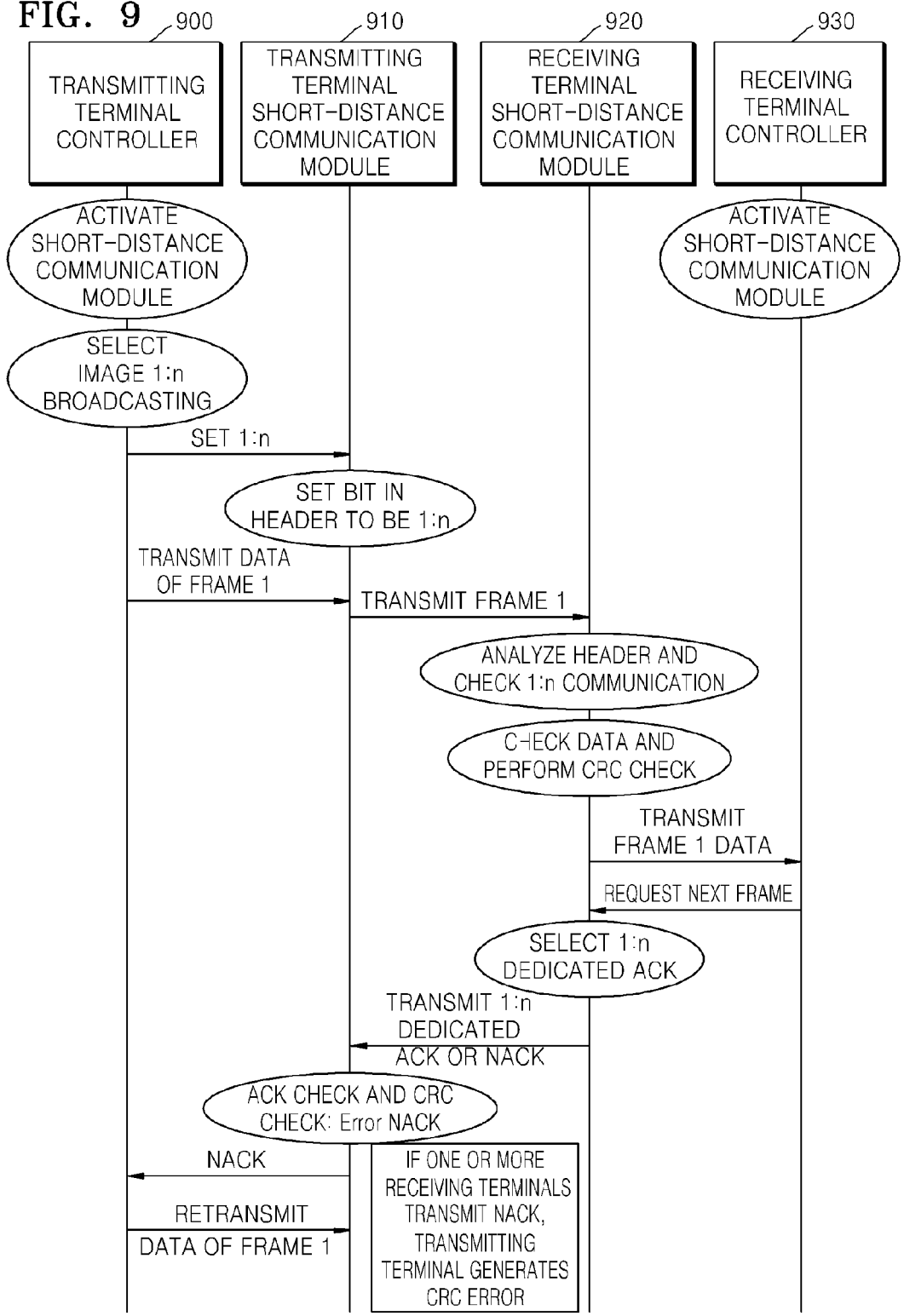
FIG. 9 is a signal flowchart illustrating a communication method, according to another embodiment of the invention.

FIG. 9 is a signal flowchart illustrating a communication method, according to another embodiment of the invention. Referring to FIG. 9, a transmitting terminal controller 900 and a receiving terminal controller 930 each activate respective short-distance communication modules 910 and 920.

When the transmitting terminal controller 900 selects an image one-to-many communication, the transmitting terminal short-distance communication module 910 sets in a header a bit corresponding to one-to-many communication. The transmitting terminal short-distance communication module 910 transmits a frame 1 to a receiving terminal upon request by the transmitting terminal controller 900 to transmit data of the frame 1. Although it is not illustrated, there may be a plurality of receiving terminals. The receiving terminal short-distance communication module 920 separates the header from transmission data and analyzes the header to check whether the received data is transmitted in one-to-many communication. Whether it is one-to-one communication or one-to-many communication is checked by analyzing whether the bit is set in the header. After checking the data and performing a CRC check, the receiving terminal short-distance communication module 920 transmits the frame 1 to the receiving terminal controller 930. The receiving terminal short-distance communication module 920 selects an ACK signal dedicated to one-to-many communication and transmits a selected ACK signal to the transmitting terminal upon the request by the receiving terminal controller 930 to request a next frame. The transmitting terminal short-distance communication module 910 checks the ACK signal and performs a CRC check. When a NACK signal is transmitted, an ACK signal is corrupted during transmission, or any one of the receiving terminals transmits a NACK signal, an error is generated during the CRC check. The transmitting terminal short-distance communication module 910 notifies the transmitting terminal controller 900 of the NACK signal. The transmitting terminal short-distance communication module 910 retransmits the frame 1 to the receiving terminal upon the request by the transmitting terminal controller 900 to retransmit the frame 1.

Figure 10:
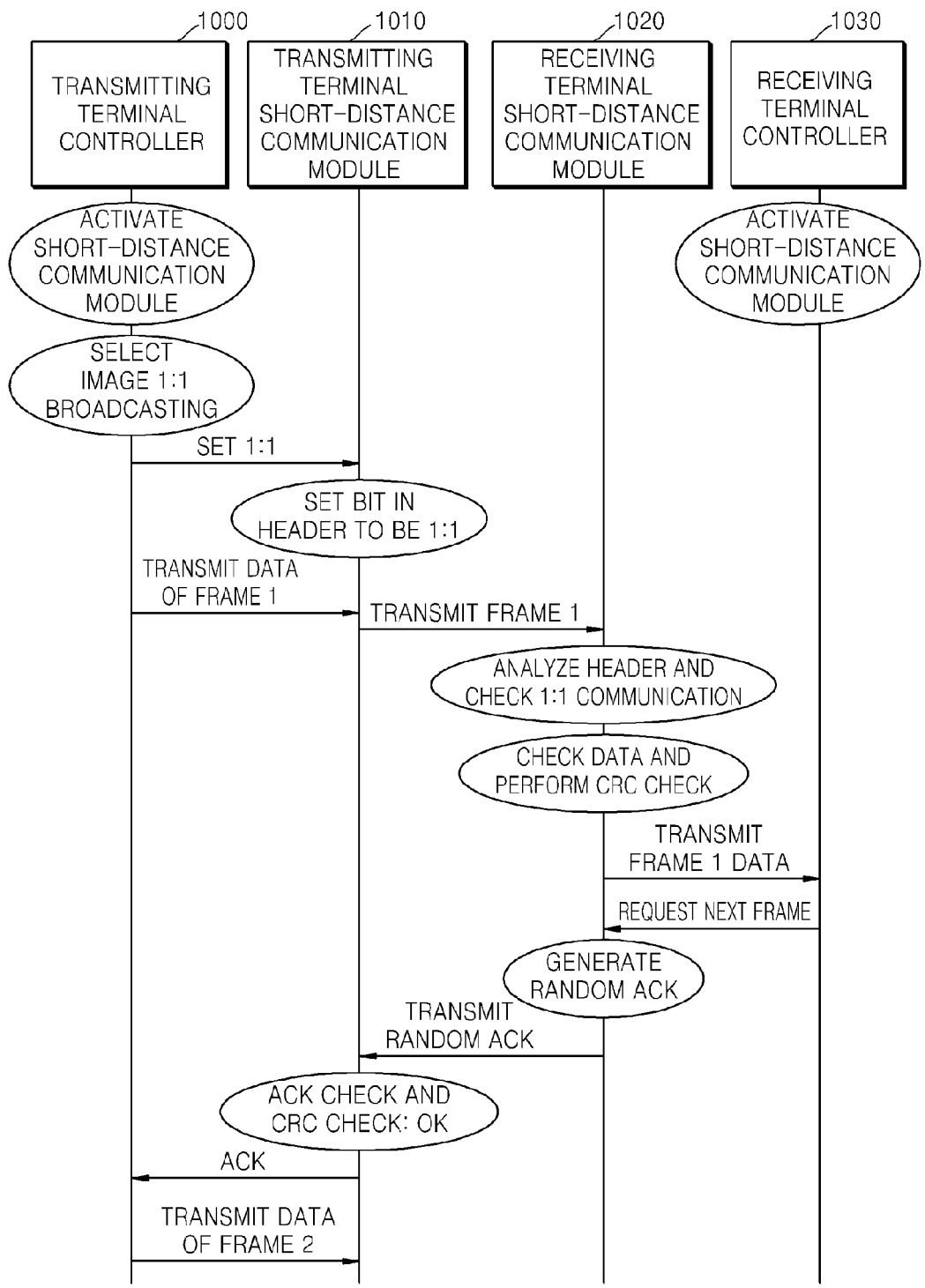
FIG. 10 is a signal flowchart illustrating a communication method, according to another embodiment of the invention.

FIG. 10 is a signal flowchart illustrating a communication method, according to another embodiment of the invention. Referring to FIG. 10, a transmitting terminal controller 1000 and a receiving terminal controller 1030 each activate respective short-distance communication modules 1010 and 1020.

When the transmitting terminal controller 1000 selects an image one-to-one communication, the transmitting terminal short-distance communication module 1010 sets in a header a bit corresponding to one-to-one communication. The transmitting terminal short-distance communication module 1010 transmits a frame 1 to a receiving terminal upon request by transmitting terminal controller 1000 to transmit data of the frame 1. The receiving terminal short-distance communication module 1020 separates the header from transmission data and analyzes the header to check whether the received data is transmitted in one-to-one communication. Whether it is one-to-one communication or one-to-many communication is checked by analyzing whether the bit is set in the header. After checking the data and performing a CRC check, the receiving terminal short-distance communication module 1020 transmits the frame 1 to the receiving terminal controller 1030. The receiving terminal short-distance communication module 1020 randomly selects a time to generate an ACK signal dedicated to one-to-one communication and transmit the generated ACK signal to the transmitting terminal upon the request by the receiving terminal controller 1030 to request a next frame. The transmitting terminal short-distance communication module 1010 checks the ACK signal and performs a CRC check. The transmitting terminal short-distance communication module 1010 transmits a next frame upon request by the transmitting terminal controller 1000 to transmit a frame 2.

Figure 11A:
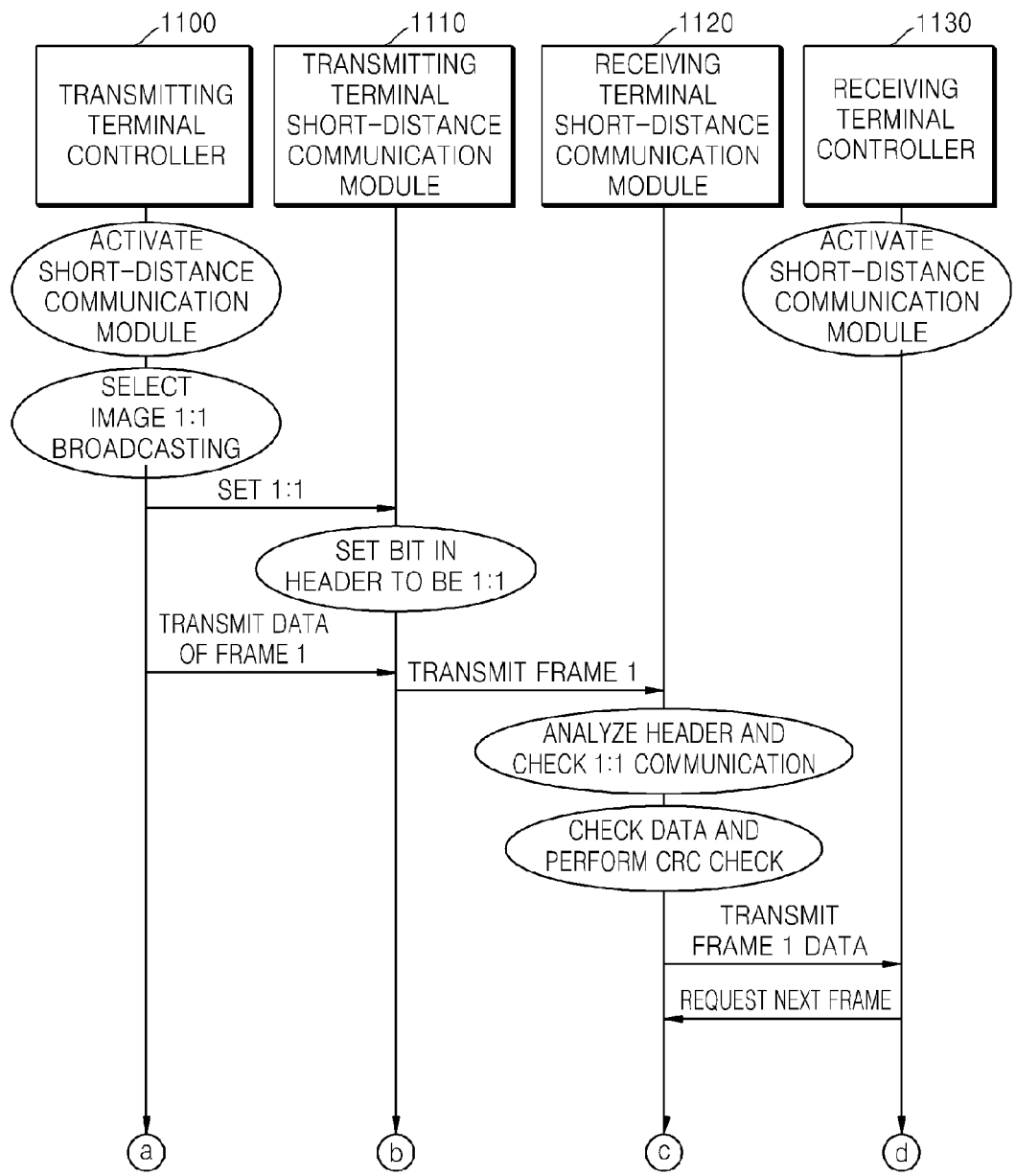
FIGS. 11A and B are a signal flowchart illustrating a communication method, according to another embodiment of the invention.
Figure 11B:
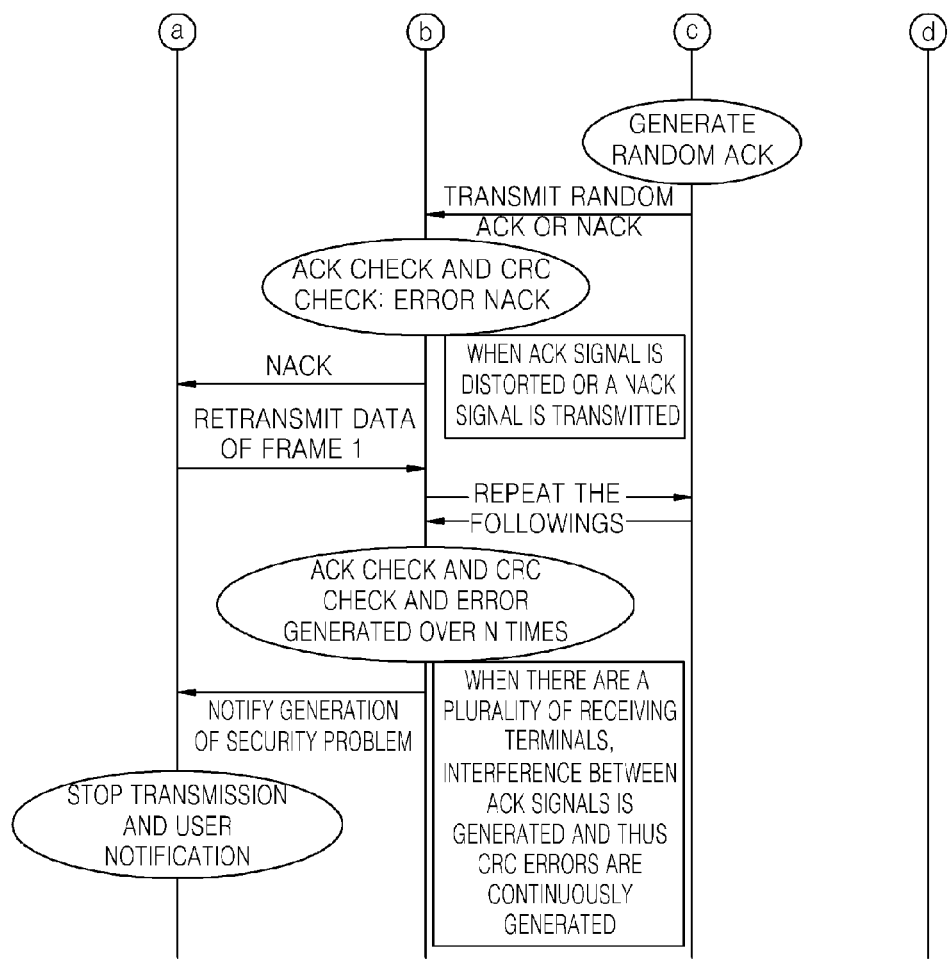

FIGS. 11A and 11B are a signal flowchart for illustrating a communication method, according to another embodiment of the invention. Referring to FIG. 11, a transmitting terminal controller 1100 and a receiving terminal controller 1130 each activate respective short-distance communication modules 1110 and 1120.

When the transmitting terminal controller 1100 selects an image one-to-one communication, the transmitting terminal short-distance communication module 1110 sets in a header a bit corresponding to one-to-one communication. The transmitting terminal short-distance communication module 1110 transmits a frame 1 to a receiving terminal upon request by the transmitting terminal controller 1100 to transmit data of the frame 1. The receiving terminal short-distance communication module 1120 separates the header from transmission data and analyzes the header to check whether the received data is transmitted in one-to-one communication. Whether it is one-to-one communication or one-to-many communication is checked by analyzing whether the bit is set in the header. After checking the data and performing a CRC check, the receiving terminal short-distance communication module 1120 transmits the frame 1 to the receiving terminal controller 1130. The receiving terminal short-distance communication module 1120 randomly waits a period of time, generates an ACK signal dedicated to one-to-one communication, and transmits a generated ACK signal to the transmitting terminal upon the request by the receiving terminal controller 1130 to request a next frame. The transmitting terminal short-distance communication module 1110 checks the ACK signal and performs a CRC check. When the ACK signal is incomplete or damaged, or a NACK signal is transmitted, an error is generated during the CRC check. The transmitting terminal short-distance communication module 1110 notifies the transmitting terminal controller 1100 of the NACK signal. Then, the transmitting terminal short-distance communication module 1110 retransmits the frame 1 to the receiving terminal upon request by the transmitting terminal controller 1100 to retransmit the frame 1. When the transmitting terminal short-distance communication module 1110 receives an ACK signal that is randomly sent by a third-party receiving terminal other than a target receiving terminal of the one-to-one communication, the ACK signal becomes incomplete. In this case, the frame 1 is first retransmitted and then the ACK signal is rechecked. When the ACK signal is distorted over a predetermined frequency or a CRC error is generated, the transmitting terminal short-distance communication module 1110 notifies the transmitting terminal controller 1100 of the possibility of a security problem, stops transmission, and notifies a user thereof.

As described above, in the communication apparatus according to the invention, because one-to-many communication is performed with a simple protocol for one-to-one communication according to a user selection, a time for transmitting data from a transmitting terminal to a plurality of receiving terminals may be substantially reduced to be the same as a communication time of one-to-one communication. Also, during one-to-one short-distance communication, a third-party receiving terminal may be prevented from receiving data of the one-to-one communication.

The example methods disclosed herein may be implemented through machine-readable instructions recorded on a tangible article of manufacture such as a computer-readable storage media and executed by one or more processors. The machine-readable instructions may include individual or any combination of program instructions, data files, and/or data structures. The program instructions recorded on the computer-readable storage media can be specially designed and/or constructed as known to and/or used by a person skilled in the art of computer software. Examples of the computer readable storage media include magnetic media (e.g., hard disks, floppy disks, magnetic tapes, etc), optical recording media (e.g., CD-ROMs, or DVDs), magneto-optical media such as floppy disks, and/or hardware devices specially configured to store and perform program instructions (ROM, RAM, flash memories, etc). Computer-readable storage media may be distributed over network coupled computer systems so that the machine-readable instructions are stored and/or executed in a distributed fashion. This media can be read by the computer, stored in its memory, and executed by a processor. Examples of program instructions include machine language codes produced by a compiler and/or high-level language codes that can be executed by a computer using an interpreter. The hardware devices can be constructed as one or more software modules in order to perform the operations according to the present disclosure, and vice versa.

Also, using the disclosure herein, programmers of ordinary skill in the art to which this patent pertains can easily implement functional programs, codes, and code segments for making and using the disclosed embodiments.

The embodiments disclosed herein may be described in terms of functional block components and/or methods. Such functional blocks may be realized by any number of hardware and/or software components configured to perform the specified functions. For example, various integrated circuit components, e.g., memory elements, processing elements, logic elements, look-up tables, and the like, may be used to carry out a variety of functions under the control of one or more microprocessors or other control devices. Similarly, where the elements of this disclosure are implemented using software programming and/or software elements, the disclosed embodiments may be implemented with any programming or scripting language such as C, C++, Java, assembler, or the like, with the various algorithms being implemented with any combination of data structures, objects, processes, routines and/or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of the methods described herein can be performed in any suitable order unless otherwise indicated herein and/or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosed embodiments, reference has been made to the embodiments illustrated in the drawings, and specific language has been used to describe these embodiments. However, no limitation of the scope of this disclosure is intended by this specific language, and the claimed inventions should be construed to encompass all embodiments that would normally occur to one of ordinary skill in the art. The terminology used herein is for the purpose of describing the particular embodiments and is not intended to be limiting the embodiments of this patent.

The use of any and all examples, or exemplary language (e.g., "such as") provided herein, is intended merely to better illuminate the claimed inventions and does not pose a limitation on the scope of the claimed inventions unless otherwise claimed. Numerous modifications and adaptations will be readily apparent to those of ordinary skill in this art without departing from the spirit and scope of the claimed inventions. Therefore, the scope of the claimed inventions is defined not by the detailed description but includes all equivalents and differences within the scope of the present disclosure.

No item or component is essential to the practice of the disclosed embodiments unless the element is specifically described as "essential" or "critical". It will also be recognized that the terms "comprises," "comprising," "includes,"

"including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While communication apparatuses, methods and systems have been particularly shown and described with reference to exemplary embodiments thereof, it will be understood by those of ordinary skill in the art that various changes in form and details may be made therein without departing from the spirit and scope of the disclosure and/or as defined by the following claims or their equivalents.

What is claimed is:

1. A communication apparatus comprising a short-distance communication module configured to transmit or receive data within a range of several centimeters to tens of centimeters, the short-distance module comprising:
   a transmitting unit configured to transmit data to a single receiver or to a plurality of receivers so as to transmit as a one-to-one or as a one-to-many transmitter, respectively;
   a receiving unit configured to receive data from a single transmitter or a from a plurality of transmitters as to receive as a one-to-one or as a one-to-many receiver, respectively;
   an interface unit comprising a processor configured to control input or output of data to be transmitted by the transmitting unit or data received by the receiving unit so as to perform the following operations:
      controlling the transmitting unit and receiving unit to selectively perform one-to-one communication or one-to-many communication in short-distance communication within the range of several centimeters to tens of centimeters;
      setting a sampling rate for sampling transmission data of the communication apparatus to be greater than the inverse of an arrival time difference of the
      transmission data determined according to a maximum communication distance between communication apparatuses; and
      performing one-to-many communication using a one-to-one protocol in which a plurality of received synchronized ACK signals are interpreted as a single ACK signal or a plurality of received synchronized NACK signals are interpreted as a single NACK signal so that the plurality of received one-to-many communication ACK or NACK signals are received in a time not longer than a time to receive a single one-to-one communication signal.

2. The communication apparatus of claim 1, wherein the short-distance communication module sets the sampling rate to be four times greater than the inverse of the arrival time difference.

3. The communication apparatus of claim 1, wherein the short-distance communication module sets the sampling rate to be eight times greater than the inverse of the arrival time difference.

4. The communication apparatus of claim 1, wherein the short-distance communication module utilizes a bit for identifying the one-to-one communication versus the one-to-many communication in a header of the transmission data.

5. The communication apparatus of claim 1, wherein, in the case of one-to-one communication, the short-distance communication module receives the transmission data, randomly generates an ACK signal, and transmits a generated ACK signal to a communication apparatus transmitting the transmission data.

6. The communication apparatus of claim 1, wherein, in the case of one-to-many communication, the short-distance communication module receives the transmission data and transmits an ACK signal dedicated to one-to-many communication to a communication apparatus transmitting the transmission data.

7. A communication system comprising:
   a first communication apparatus comprising:
      a transmitting unit configured to transmit data to a single receiver or to a plurality of receivers so as to transmit as a one-to-one or as a one-to-many transmitter, respectively;
      a receiving unit configured to receive data from a single transmitter or a from a plurality of transmitters so as to receive as a one-to-one or as a one-to-many receiver, respectively;
      wherein the first communication apparatus is configured to perform one-to-many communication using a one-to-one protocol in which a plurality of received synchronized ACK signals are interpreted as a single ACK signal or a plurality of received synchronized NACK signals are interpreted as a single NACK signal so that the plurality of received one-to-many communication ACK or NACK signals are received in a time not longer than a time to receive a single one-to-one communication signal, and
   wherein the first communcation apparatus is further configured to perform the following operations:
      setting a sampling rate for sampling transmission data to be greater than an inverse of an arrival time difference of the transmission data determined according to a maximum communication distance from a second communication apparatus; and
      transmitting the transmission data to the second communication apparatus; and
   a second communication apparatus that receives the transmission data from the first communication apparatus, and transmits an ACK signal to the first communication apparatus.

8. The communication system of claim 7, wherein there are at least two second communication apparatuses.

9. The communication system of claim 8, wherein the first communication apparatus selectively performs one-to-one communication or one-to-many communication in a short-distance communication within a range of several centimeters to tens of centimeters.

10. The communication system of claim 9, wherein the first communication apparatus assigns a bit for signifying the one-to-one communication versus the one-to-many communication in a header of the transmission data.

11. The communication system of claim 9, wherein, in the case of one-to-one communication, the second communication apparatus receives the transmission data, randomly generates an ACK signal, and transmits the generated ACK signal to the first communication apparatus.

12. The communication system of claim 11, wherein the first communication apparatus checks the ACK signal transmitted by the second communication apparatus and transmits additional transmission data to the second communication apparatus.

13. The communication system of claim 11, wherein, when receiving an ACK signal from another second communication apparatus, the first communication apparatus compares the ACK signal received from the second communication apparatus with the ACK signal received from the other second communication apparatus and, if the ACK signals do not match with each other, retransmits the transmission data to the second communication apparatus.

14. The communication system of claim 11, wherein, when retransmitting the transmission data and receiving an ACK signal from the other second communication apparatus, the first communication apparatus compares the ACK signal received from the second communication apparatus with the ACK signal received from the other second communication apparatus and, if the ACK signals do not match with each other, stops transmission of the transmission data.

15. The communication system of claim 9, wherein, in the case of one-to-many communication, each of the second communication apparatus and the other second communication apparatus receives the transmission data and transmits an ACK signal dedicated to one-to-many communication to the first communication apparatus.

16. The communication system of claim 7, wherein the first communication apparatus is a digital photographing apparatus having a short-distance communication module.

17. A communication method, comprising:
performing one-to-many communication using a one-to-one protocol in which a plurality of received synchronized ACK signals are interpreted as a single ACK signal or a plurality of received synchronized NACK signals are interpreted as a single NACK signal so that the plurality of received one-to-many communication ACK or NACK signals are received in a time not longer than a time to receive a single one-to-one communication signal,
wherein performing the one-to-many communication comprises performing the following operations:
activating a short-distance communication module, in a controller of each of a transmitting terminal and a receiving terminal,
wherein the transmitting terminal is configured to transmit data to a single receiver or to a plurality of receivers so as to transmit as a one-to-one or as a one-to-many transmitter, respectively, and
the receiving terminal is configured to receive data from a single transmitter or a from a plurality of transmitters so as to receive as a one-to-one or as a one-to-many receiver, respectively;
selecting one-to-many communication, using the controller of the transmitting terminal;
setting a bit corresponding to one-to-many communication in a header of data of an image to be transmitted, using the short-distance communication module of the transmitting terminal;
transmitting a first frame of the image to be transmitted to the receiving terminal, using the short-distance communication module of the transmitting terminal;
checking the bit of the header to check the one-to-many communication, using the short-distance communication module of the receiving terminal;
checking the received first frame and requesting a second frame, using the controller of the receiving terminal;
transmitting an ACK signal dedicated to one-to-many communication to the transmitting terminal, using the short-distance communication module of the receiving terminal; and
checking the ACK signal dedicated to one-to-many communication and transmitting the second frame to the receiving terminal, using the short-distance communication module of the transmitting terminal.

18. The communication method of claim 17, wherein there are at least two receiving terminals, and the communication method further comprising:
checking the ACK signals dedicated to one-to-many communication received from the at least two receiving terminals, using the short-distance communication module of the transmitting terminal; and
retransmitting the first frame to the at least two receiving terminals when the received ACK signals dedicated to one-to-many communication are not matched with each other or a NACK signal is received from at least one receiving terminal.

* * * * *